(12) United States Patent
Spitzer

(10) Patent No.: US 6,488,239 B2
(45) Date of Patent: Dec. 3, 2002

(54) AIRCRAFT CONTROL LEVER VERNIER

(76) Inventor: A. Robert Spitzer, 20180 W. Twelve Mile Rd., Suite 10, Southfield, MI (US) 48076

( * ) Notice: Subject to any disclaimer, the term of this patent is extended or adjusted under 35 U.S.C. 154(b) by 0 days.

(21) Appl. No.: 09/872,371

(22) Filed: Jun. 1, 2001

(65) Prior Publication Data

US 2002/0014559 A1 Feb. 7, 2002

Related U.S. Application Data

(60) Provisional application No. 60/209,021, filed on Jun. 2, 2000.

(51) Int. Cl.[7] .............................................. B64C 13/28
(52) U.S. Cl. ..................................... 244/234; 74/471 R
(58) Field of Search ................................ 244/234–236; 74/471 XY, 507, 522, 525, 530, 10.22, 471 R

(56) References Cited

U.S. PATENT DOCUMENTS

| | | | | |
|---|---|---|---|---|
| 1,536,039 A | * | 4/1925 | Bradley | |
| 1,987,066 A | * | 1/1935 | Kingston | |
| 2,171,573 A | * | 9/1939 | Kenny et al. | |
| 2,313,768 A | * | 3/1943 | Putt | |
| 2,404,030 A | * | 7/1946 | Browne | |
| 2,747,426 A | * | 5/1956 | Robinson | |
| 2,787,746 A | * | 4/1957 | Redmond | |
| 4,154,415 A | * | 5/1979 | Harris et al. | 244/234 |
| 5,591,082 A | * | 1/1997 | Jensen et al. | 244/234 |

* cited by examiner

Primary Examiner—Galen L. Barefoot
(74) Attorney, Agent, or Firm—Kohn & Associates, PLLC

(57) ABSTRACT

According to the present invention, there is provided an aircraft control including a control lever having a handle and a base, where the base is operatively mountable for movement between predetermined control lever positions, and a vernier adjusting mechanism for incrementally displacing the control lever between the positions. Additionally, the present invention provides for a vernier adjusting mechanism including a friction drive mechanism for finely adjusting the control lever's position.

19 Claims, 4 Drawing Sheets

AIRCRAFT CONTROL LEVER VERNIER

CROSSREFERENCE TO RELATED APPLICATIONS

This application claims the benefit of priority under 35 U.S.C. Section 119(e) of U.S. Provisional Patent Application No. 60/209,021, filed Jun. 2, 2000, which is incorporated herein by reference.

BACKGROUND OF THE INVENTION

1. Field of the Invention

This invention generally relates to the field of aircraft control devices and specifically towards a fine adjustment mechanism for controlling a throttle control lever, fuel mixture control lever, and a propeller control lever of an aircraft.

2. Description of Related Art

In a conventional twin engine aircraft, particularly a turbocharged aircraft, each engine is controlled individually through its own throttle, fuel mixture, and propeller control levers. The throttle control lever adjusts air intake into each engine, the fuel mixture control lever controls fuel intake into the engine, and the propeller control lever controls the propeller revolutions. All of these controls regulate the overall thrust of each engine.

The control levers are integrated into the console of the aircraft and move either forward toward the nose of the aircraft for more thrust or backward towards the tail of the aircraft for less thrust. For example, as the throttle control lever is moved forward, more air enters the aircraft engine, which in turn generates more thrust from the aircraft engine. Since there are three control levers for each engine, a typical twin engine aircraft has a total of six control levers for the throttle, fuel mixture and propeller controls. The control levers for each function are adjacent to each other, but move independently from each other.

Due to various factors, each engine will require more or less thrust in order to maintain altitude, control, and direction. Additionally, each engine needs to be precisely adjusted to match the other engine's power and to synchronize the two engines. During a flight, each aircraft engine is adjusted constantly by an operator. The operator changes the throttle, fuel mixture, and propeller control lever positions slightly, until a correct balance is achieved. These adjustments made during a flight are performed in minor increments. But, because the control levers are large levers, making fine or minor adjustments to the control levers is very difficult. As a result, over or under adjustment of any of the control lever frequently occurs.

Accordingly, there is a need for a device or apparatus that can finely adjust the throttle, fuel mixture, and propeller control levers' positions, so that over or under adjustment of any of the control lever position is minimized. Moreover, there is a need for a device or apparatus that performs fine adjustments without interfering with the normal operation of the control levers. Thus, the fine adjusting device or apparatus needs to be capable of being over-ridden by the normal operational movement of the control lever by the operator.

SUMMARY OF THE INVENTION

According to the present invention, there is provided an aircraft control including a control lever having a handle and a base, where the base is operatively mountable for movement between predetermined control lever positions, and a vernier adjusting mechanism for incrementally displacing the control lever between the positions. Additionally, the present invention provides for a vernier adjusting mechanism including a friction drive mechanism for finely adjusting the control lever's position.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
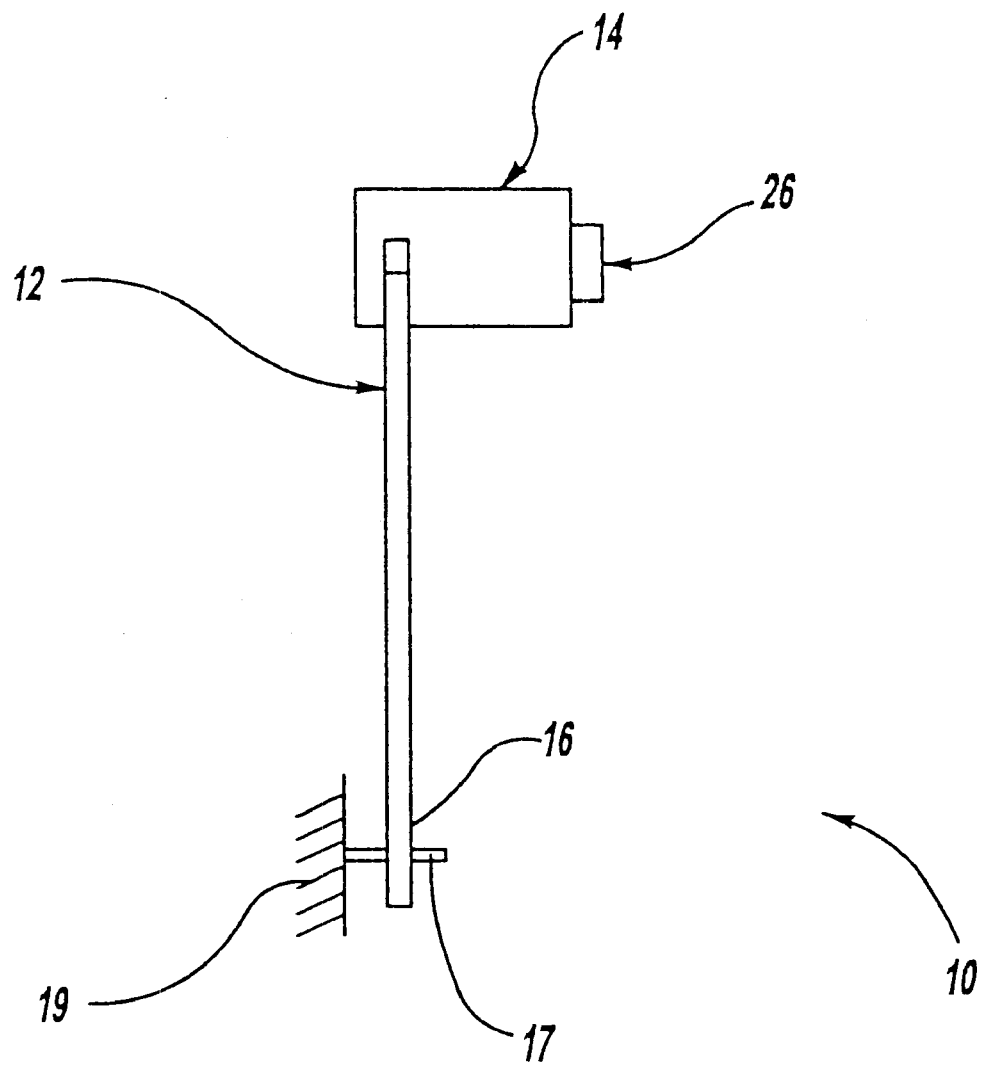
FIG. 1 is a front elevational view of current prior art control levers.
Figure 2:
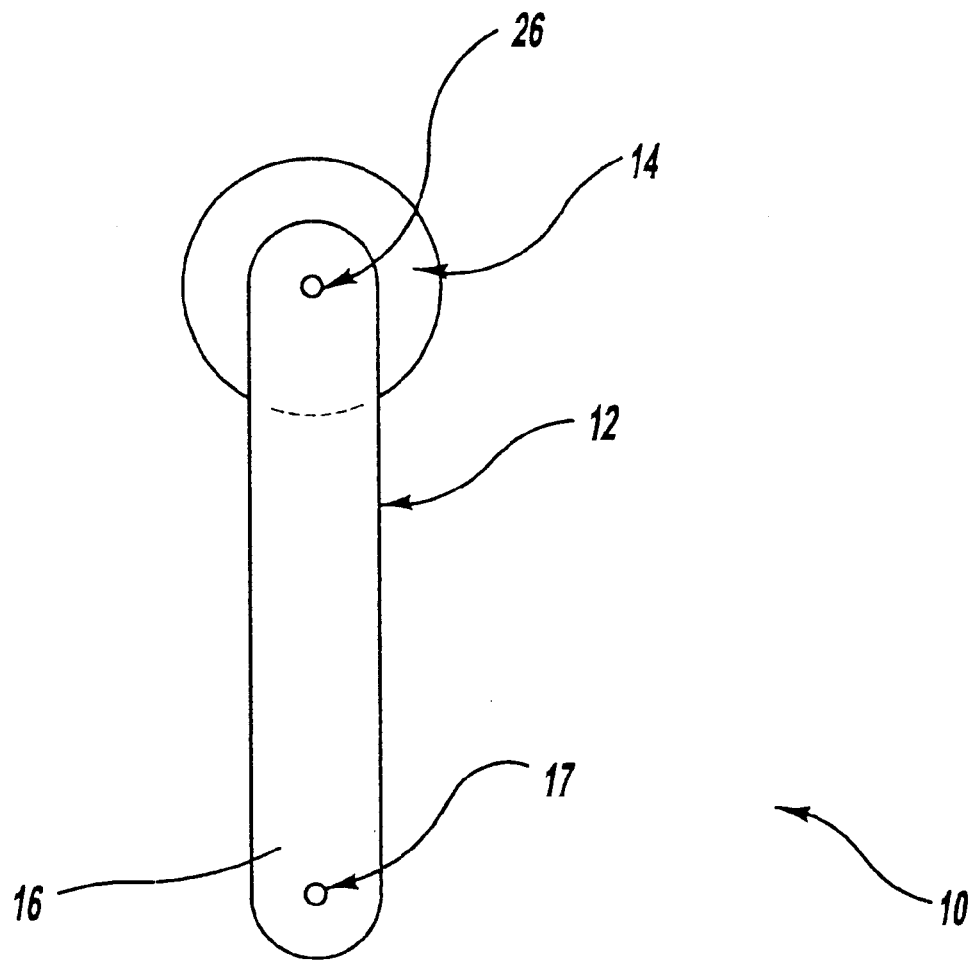
FIG. 2 is a side elevation view of current prior art control levers.
Figure 3:
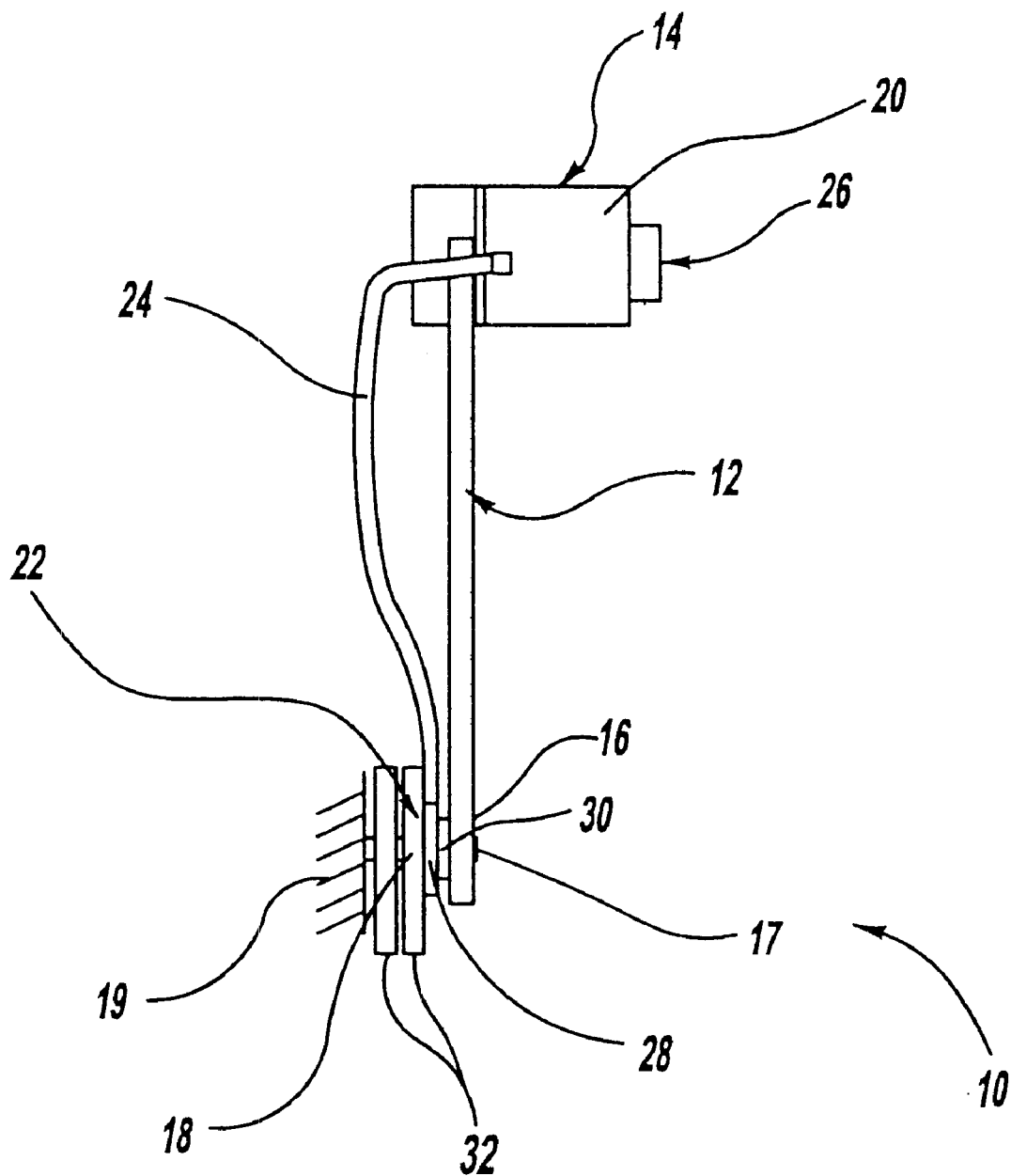
FIG. 3 is a front elevational view of a preferred embodiment of the present invention including a control lever and vernier adjusting mechanism having a friction drive mechanism.
Figure 4:
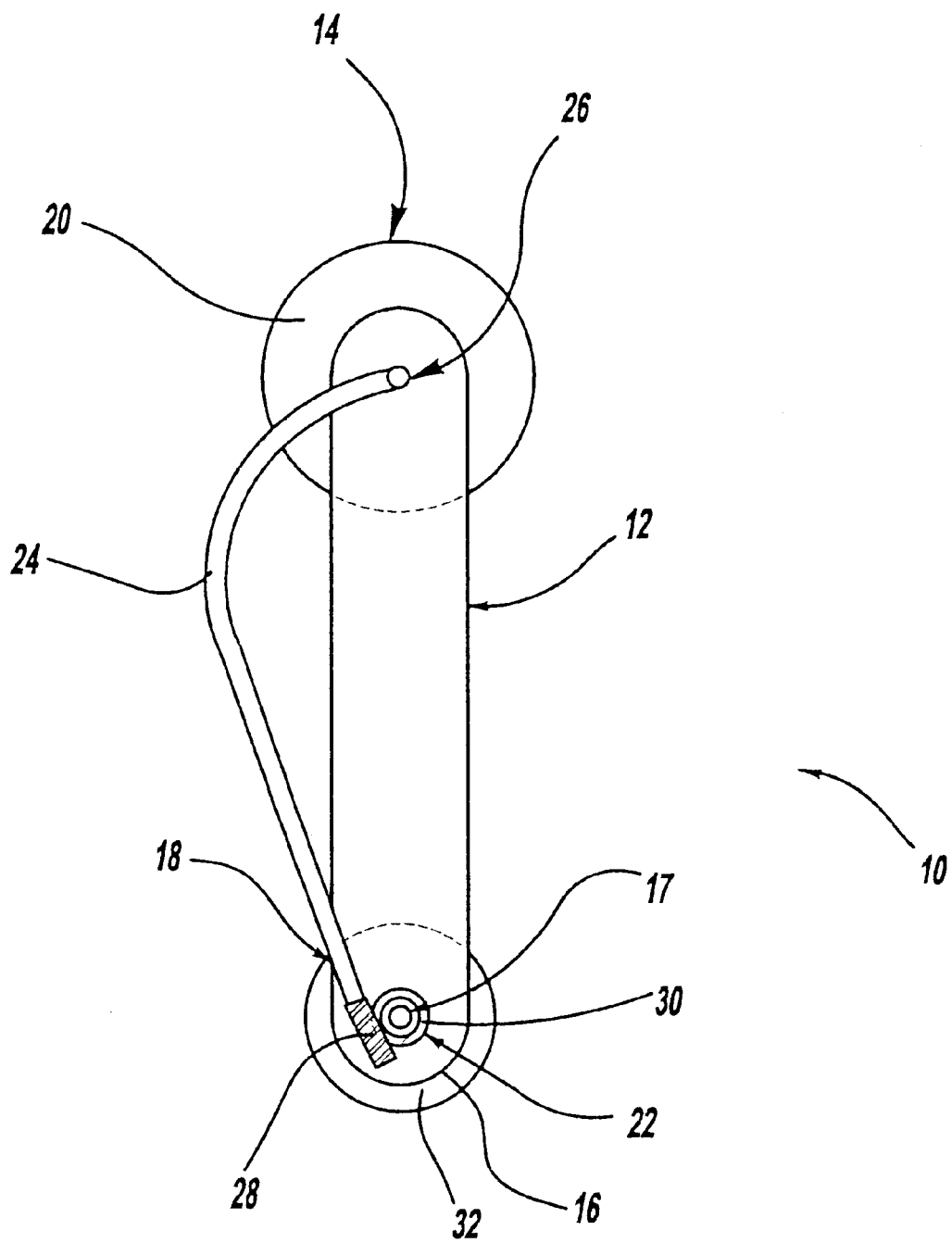
FIG. 4 is a side elevation view of a preferred embodiment of the present invention including a control lever and vernier adjusting mechanism having a friction drive mechanism.

The present invention provides for an aircraft control, generally shown at 10 in the figures, including a control lever 12 having a handle 14 and base 16 and a vernier adjusting mechanism, generally indicated at 18. The base 16 is operatively mountable for movement between predetermined control lever 12 positions. The vernier adjusting mechanism 18 incrementally displaces the control lever 12 between the positions. The positions of the control lever 12 are through an arc about a mounting pivot 17 located at the base 16 connected to a support 19. Accordingly, an operator of the aircraft is capable of grossly displacing the control lever 12, thereby translating movement of the appropriate valve or switch the control lever 12 regulates in the engine.

The present invention aids the operator in making fine or minor adjustments to the control lever's 12 position. The control lever 12 adjusts a throttle, which controls airflow into the aircraft engine, a fuel mixture control, and a propeller control, which adjusts the revolutions per minute of the engine. As a result of adjusting the control lever 12, which is operatively connected to a valve or switch in the aircraft's engine, the thrust of the aircraft engine is increased or decreased. Thus, the present invention aids the operator in making minor adjustments to the thrust of the aircraft engine and ultimately controls the entire aircraft.

The vernier adjusting mechanism 18 includes several components. In the preferred embodiment, the vernier adjusting mechanism 18 includes a manually rotating knob 20, a friction drive mechanism,, generally indicated at 22, and a drive cable 24. The drive cable 24 is made from materials including, but not limited to, metal, nylon, combinations thereof, and any other similar wire materials known to those of skill in the art. The drive cable 24 operatively connects the manually rotating knob 20 to the friction drive mechanism 22. The manually rotating knob 20 rotates the drive cable 24, which translates movement to the friction drive mechanism 22.

The manual rotating knob 20 is operatively integrated with the handle 14 and connected thereto by a connecting mechanism 26. The connecting mechanism 26 is made of materials including, but not limited to, screws, bolts, pins, bars, and other similar connecting devices known to those of skill in the art. Such connections are well known to those of skill in the art. Moreover, the connections can be made by methods such as swagging, clamping, welding or the like. Finally, the control lever 12 can be manufactured with the manual rotating knob 20 already in place, or any currently existing control levers 12 can be retrofitted with the manual rotating knob 20 along with the entire vernier adjusting mechanism 18 of the present invention.

The manual rotating knob 20 is a substantially round knob or control that is operatively connected to the drive cable 24. The manual rotating knob 20 rotates the drive cable 24 directly or with the additionally aid of a gear mechanism that permits incremental movements of the drive cable 24. Therefore, by manual rotation of the manual rotating knob 20, the drive cable 24 is rotated, which in turn translationally rotates the friction drive mechanism 22.

The friction drive mechanism 22 contains several components. The friction drive mechanism 22 includes a worm gear mechanism 28, a drive gear 30, and a friction slip disc mechanism 32. All of these mechanisms are operatively engaged to each other and to the base 16 of the control lever 12 at the connection swivel point 17. Further, these mechanisms, along with all other mechanisms disclosed herein, are all well known to those of skill in the art. Thus, manufacturing and materials used to manufacture these mechanisms are well known to those of skill in the art. Finally, sizes of the gears depend upon the required torque needed to displace the control lever 12 between the predetermined positions.

The worm gear mechanism 28 incrementally rotates the drive gear 30 by providing sufficient torque to the drive gear 30. The worm gear mechanism 28 is operatively connected to the drive cable 24 and thus translates the rotational movement made by the drive cable to the drive gear 30. This translational movement incrementally rotates the drive gear 30. The drive gear 30 then incrementally displaces the control lever 12 between the predetermined positions. Therefore, the slight rotation of the manual rotating knob 20 rotates the drive cable 24, which in turn rotates the worm gear mechanism 28. The worm gear mechanism 28 then translates the drive cable's 24 rotational movement to the drive gear 30, which then finely adjusts the control lever 12 between the predetermined positions.

As for the friction slip disc mechanism 32, it is an important mechanism that allows for the override of the entire vernier adjusting mechanism 18, prevents the stripping of the drive gear 30, and allows for normal operation of the control lever 12. The friction slip disc mechanism 32 is well known to those of skill in the art. For example, friction slip disc mechanisms are used in auto-pilot control drivers of aircraft. Basically, the friction slip disc mechanism 32 is made of two operatively engaged discs that allow for both the operation of the vernier adjusting mechanism 18 and the normal operational movement of the control lever 12.

Although the present invention includes a control lever 12, the vernier adjusting mechanism 18 can be retrofitted onto currently existing control levers 12. Thus, the dual control levers 12 for each function of the engine can each have a vernier adjusting mechanism 18 attached to entire the control lever 12.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An aircraft control comprising:
    a control lever including a handle and a base, said base operatively mountable for movement between predetermined control lever positions; and
    vernier adjusting means for incrementally displacing said control lever between said positions, said vernier adjusting means including friction drive means for incrementally adjusting said positions of said control lever, said friction drive means further including friction slip means for allowing fine adjustment of said positions while allowing normal operation of said control lever.

2. The aircraft control according to claim 1, wherein said control lever adjusts a throttle control, fuel mixture control, and a propeller control.

3. The aircraft control according to claim 1, wherein said base is operatively connected to a swivel point for movement between predetermined control lever positions.

4. The aircraft control according to claim 1, wherein said vernier adjusting means includes connecting means for connecting said vernier adjusting means to said handle.

5. The aircraft control according to claim 4, wherein said connecting means is selected from the group consisting essentially of screws, bolts, pins, and bars.

6. The aircraft control according to claim 1, wherein said vernier adjusting means includes a manually rotating knob operatively integrated into said handle, and a drive cable, said drive cable operatively connecting said manually rotating knob to said friction drive means.

7. The aircraft control according to claim 6, wherein said manually rotating knob includes gear means for incrementally rotating said drive cable.

8. The aircraft control according to claim 6, wherein said drive cable is composed of material selected from the group consisting essentially of metal, nylon and combinations thereof.

9. The aircraft control according to claim 1, wherein said friction drive means includes worm gear means for incrementally rotating a drive gear, said worm gear means incrementally displaces said control lever by providing sufficient torque to said drive gear to finely adjust said control lever's predetermined positions.

10. The aircraft control according to claim 9, wherein said drive gear engages said friction slip disc means for allowing the fine adjustment operation of said drive gears and for allowing normal operation of said control lever.

11. Vernier adjusting means for incrementally displacing an airplane control lever, said control lever including a handle and a base, said vernier adjusting means including friction drive means for incrementally adjusting said positions of said control lever, said friction drive means further including friction slip means for allowing fine adjustment of said positions and allowing normal operation of said control lever.

12. The vernier adjusting means according to claim 11, wherein said control lever adjusts a throttle control, fuel mixture control, and a propeller control.

13. The vernier adjusting means according to claim 11, including connecting means for connecting said vernier adjusting means to said handle.

14. The vernier adjusting means according to claim 13, wherein said connecting means is selected from the group consisting essentially of screws, bolts, pins, and bars.

15. The vernier adjusting means according to claim 11, including a manually rotating knob operatively integrated into said handle, friction drive means for incrementally adjusting said positions of said control lever, and a drive cable, said drive cable operatively connecting said manually rotating knob to said friction drive means.

16. The vernier adjusting means according to claim 15, wherein said manually rotating knob includes gear means for incrementally moving said drive cable.

17. The vernier adjusting means according to claim 15, wherein said drive cable is made from material selected from the group consisting essentially of metal, nylon and combinations thereof.

18. The vernier adjusting means according to claim 15, wherein said friction drive means includes worm gear means for incrementally rotating a drive gear, said worm gear means incrementally displaces said control lever by providing sufficient torque to said drive gear to finely adjust said control lever's predetermined positions.

19. The vernier adjusting means according to claim 18, wherein said drive gear means engages said friction slip disc means for allowing the fine adjustment operation of said drive gears and for allowing normal operation of said control lever.

* * * * *